United States Patent [19]

Zondler

[11] Patent Number: 4,838,658
[45] Date of Patent: Jun. 13, 1989

[54] LIQUID CRYSTAL ALIGNMENT LAYER WITH SIDECHAINS CONTROLLING TILT ANGLE

[75] Inventor: Rolf Zondler, Stuttgart, Fed. Rep. of Germany

[73] Assignee: Nokia Graetz GmbH, Stuttgart, Fed. Rep. of Germany

[21] Appl. No.: 108,049

[22] Filed: Oct. 13, 1987

[30] Foreign Application Priority Data

Oct. 17, 1986 [DE] Fed. Rep. of Germany ....... 3635331

[51] Int. Cl.⁴ ................................................ G02F 1/13
[52] U.S. Cl. ................................................ 350/339 R
[58] Field of Search ................................ 350/340, 341

[56] References Cited

U.S. PATENT DOCUMENTS 3,854,793 12/1974 Kahn ..................................... 350/340
3,991,241 11/1976 Matsumoto et al. ................. 350/341
4,472,028 9/1986 Ooue et al. .......................... 350/341
4,593,977 6/1986 Takamatsu et al. ................. 350/341

Primary Examiner—Stanley D. Miller
Assistant Examiner—Anita E. Pellman
Attorney, Agent, or Firm—Peter C. Van Der Sluys

[57] ABSTRACT

A liquid crystal cell is disclosed in which the cell walls facing the liquid crystal material are provided with alignment layers of organic material. This material consists of polymer chains with side chains. The ends of the side chains interact with the liquid crystal molecules. The side chains are shorter than the liquid crystal molecules. By suitable choice of the length of the side chains, the tilt angle can be set. It is also possible to provide alternately different side chains one of which interacts with one end of the liquid crystal molecule, while the neighboring side chain interacts with the other end of the same molecule.

11 Claims, No Drawings

LIQUID CRYSTAL ALIGNMENT LAYER WITH SIDECHAINS CONTROLLING TILT ANGLE

BACKGROUND OF THE INVENTION

1. Field of the Invention

The present invention relates to a liquid crystal cell and more particularly to a cell wherein alignment layers of organic material are provided on those surfaces of the cell walls which face the liquid crystal material.

2. Description of the Prior Art

In certain liquid crystal cells, particularly in those with nematic and cholesteric liquid crystals, the cell walls which are in contact with the liquid crystal material must be provided with alignment layers to achieve the desired molecular orientation of the liquid crystals. As a rule, the alignment layers are deposited so that the molecules at opposite cell walls lie mutually at 90°. As is known from DE-OS No. 29 45 641, DE-OS No. 29 16 670, and German Pat. No. 24 57 641, the alignment layer consists either of inorganic substances deposited by oblique evaporation in a vacuum or of organic substances applied by dipping, brushing, or spraying.

Alignment layers of inorganic material, such as calcium fluoride or silicon monoxide, are formed by evaporating the substances in a high vacuum at a very small angle to the substrate. Such layers are unsuitable for mass production because they require a very large amount of work and apparatus.

Alignment layers of organic substances are relatively easy to produce because the organic material, dissolved in a solvent, can be applied by dipping, spraying, or brushing, which necessitates only simple equipment. In such layers, the desired molecular orientation is achieved by subjecting the applied material to directional mechanical action, particularly to shearing forces, by treating the layer in a given direction with a brush, a roller, or a squeezer. The liquid crystal molecules then align themselves on such a layer by adhering at one end to the organic alignment layer. Various forces may arise during this alignment, such as Van der Waals forces, as is mentioned in DE-OS No. 29 16 670.

Unlike the oblique evaporation technique, however, the use of organic alignment layers does not make it possible to fix the tilt angle of the liquid crystal molecules.

SUMMARY OF THE INVENTION

It is an object of the present invention to provide a liquid crystal cell having alignment layers of organic material with which different tilt angles can be achieved by changes in the molecular structure, and which is structured so as to be able to interact with liquid crystal molecules from different classes of substances.

The present invention contemplates a liquid crystal cell having alignment layers of organic material which are provided on those surfaces of the cell walls which face the liquid crystal material. The material of the alignment layer consists of polymer chains with side chains having a structure such that their end groups interact at their free ends with at least one end of the liquid crystal molecules in such a way that the ends of the liquid crystal molecules are held at the ends of the side chains.

The end groups of the side chains may be linked to the polymer chain by a chain of carbon atoms. The tilt angle of the liquid crystal molecules can be controlled by the length of the side chains. The greater the desired tilt angle, the greater the length chosen for the side chains.

In general the end groups of the side chains may be selected to differ in structure in such a way so that they interact with the ends of the liquid crystal molecules in different manners, to create different cell characteristics. In like manner the structure of the end groups of the side chains may be selected in such a way that the molecules of different liquid crystals of a mixture interact with the end groups of the side chains.

DESCRIPTION OF THE PREFERRED EMBODIMENT

The material of the alignment layer consists of polymer chains with equal or different side chains in which the end groups at the free ends interact with one end of the liquid crystal molecules in such a way that the liquid crystal molecules are held at the ends of the side chains. The active end groups at the free ends are linked to the polymer chain directly or through one or more carbon atoms.

Thus, according to the invention, the organic material used for the alignment layer is a long-chain polymer with side chains.

Suitable long-chain polymers are, for example, polyvinyl alcohol, polysiloxanes, polyesters, polyimides, polyoxazoles, polythiazoles, polyimidazoles, polyoxazinones, polyoxazindiones, polyamides, polycarbonates, or polytetrafluoroethylene.

These polymers are composed of monomers which are structured so that the polymer chain to be formed has spaced-apart side chains which are capable of interacting with the liquid crystal molecules. By the interaction described above, the liquid crystal molecules are bonded to the side chains at one end. The selection of suitable side chains will, therefore, depend on the liquid crystal molecules used. By suitable choice of monomers, the spacing of the side chains can be adapted to the length of the liquid crystal molecules.

The side chains are preferably shorter than the liquid crystal molecules.

Suitable end groups of the liquid crystal molecules and the side chains are, for example, halogenes, nitrocompounds, C-N compounds, alkyls, and alkyl hydroxyl groups.

The side chains at the polymer chains may have the same structure, i.e., they may have the same length and the same active end groups at their free ends, each of which interacts with one end of a liquid crystal molecule.

To obtain a small tilt angle, the side chain must be short compared with the liquid crystal molecule. To achieve a large tilt angle, the side chain must not be much shorter than the liquid crystal molecule. For certain liquid crystal molecules, arbitrary tilt angles can be set by suitable choice of the length of the side chains.

It is also possible, however, to arrange at a polymer chain alternately different side chains one of which interacts with one end of the liquid crystal molecule, while the adjacent side chain interacts with the other end of the same liquid crystal molecule. The side chains thus have alternately different end groups at their free ends and vary in length. In that case, the tilt angle is determined by the length ratio of adjacent side chains. If the length difference is small, a small tilt angle is obtained; a large length difference gives a large tilt angle. A suitable spacing of the different side chains at the polymer chain must, of course, be chosen. It depends on the different lengths of the side chains and the length of the liquid crystal molecule. In any case, the spacing of the different side chains must be less than the length of the liquid crystal molecule.

The end groups of the side chains may also differ in such a way as to be able to interact with the ends of different liquid crystal molecules. In this manner, different liquid crystals of a mixture can be oriented in the desired directions.

What is claimed is:

1. A liquid crystal cell having a predetermined tilt angle controlled by alignment layers of organic material provided on surfaces of the cell walls which face liquid crystal material, said material of the alignment layers comprising:
    polymer chains; and
    side chains attached to said polymer chains in a regular arrangement, said side chains having the same structure including end groups interacting at their free ends with at least one end of the molecules of the liquid crystal material, one end group of each side chain interacting with one end of a liquid crystal molecule in such a way that the ends of the liquid crystal molecules are held at the ends of the side chains, whereby said tilt angle is controlled by the arrangement and structure of the side chains.

2. A liquid crystal cell as claimed in claim 1, wherein the side chains consist only of the end groups, so that the end groups are linked directly to the polymer chain.

3. A liquid crystal cell as claimed in claim 1, wherein the length of the side chains is less than the length of the liquid crystal molecules.

4. A liquid crystal cell as claimed in claim 1, wherein the desired tilt angle of the liquid crystal molecules is determined by the length chosen for the side chains.

5. A liquid crystal cell, as claimed in claim 1, wherein the tilt angle of the liquid crystal molecules is determined by the structure of the end group selected for the side chains.

6. A liquid crystal cell having a predetermined tilt angle controlled by alignment layers of organic material provided on surfaces of the cell walls which face liquid crystal material, said material of the alignment layers comprising:
    polymer chains; and
    side chains attached to said polymer chains in a regular arrangement, said side chains having the same structure including end groups linked to the polymer chain by a chain of carbon atoms, one end group of each side chain interacting at its free end with one end of a liquid crystal molecule of the liquid crystal material in such a way that the ends of the liquid crystal molecules are held at the ends of the side chains, whereby said tilt angle is controlled by the arrangement and structure of the side chains.

7. A liquid crystal cell having a predetermined tilt angle controlled by alignment layers of organic material provided on surfaces of the cell walls which face liquid crystal material, said material of the alignment layers comprising:
    polymer chains; and
    side chains attached to said polymer chains in a regular arrangement, said side chains having alternately different structures including end groups interacting at their free ends with at least one end of the molecules of the liquid crystal material in such a way that the ends of the liquid crystal molecules are held at the ends of the side chains, and each liquid crystal molecule interacts at one end with an end of a side chain of one kind, and at its other end, with the end of a side chain of another kind, whereby said tilt angle is controlled by the arrangement and structure of the side chains.

8. A liquid crystal cell as claimed in claim 7, wherein the different side chains, arranged side by side along the polymer chain, vary in length, and that their spacing along the polymer chain is less than the length of the liquid crystal molecules.

9. A liquid crystal cell as claimed in claim 7, wherein the end groups of the side chains are linked to the polymer chain by a chain of carbon atoms.

10. A liquid crystal cell as claimed in claim 9, wherein the length of the side chains is less than the length of the liquid crystal molecules.

11. A liquid crystal cell as claimed in claim 10, wherein the alternately different side chains have different lengths, whereby the tilt angle is determined by the ratio of the lengths of adjacent side chains, the larger the ratio the greater the tilt angle.

* * * * *